March 11, 1969 D. E. RITCHIE 3,432,802

EDGE BOARD AND FLAT CABLE CONNECTOR

Filed Oct. 13, 1966

INVENTOR

Douglas Eugene Ritchie

BY Mortenson and Weigel

ATTORNEYS

United States Patent Office 3,432,802
Patented Mar. 11, 1969

3,432,802
EDGE BOARD AND FLAT CABLE CONNECTOR

Douglas Eugene Ritchie, Chelmsford, Mass., assignor to Hewlett-Packard Company, Palo Alto, Calif., a corporation of California Filed Oct. 13, 1966, Ser. No. 586,451
U.S. Cl. 339—128 11 Claims
Int. Cl. H02b *1/02;* H05d *1/00;* H01r *13/50*

ABSTRACT OF THE DISCLOSURE

An enclosure for mounting an edge board or flat cable connector to a wall panel comprising a housing with interlocking top and bottom wall and screw secured side walls having resilient scalloped arms for engaging a panel opening.

This invention relates to improvements in connector assemblies for electrical devices and, more particularly, to an improved flat cable connector assembly which not only directly mounts a pluggable flat circuit board but also is adapted to be plugged directly into the cabinet of the instrument with which it is to be used.

Circuit boards are used extensively in various kinds of radio equipment, electronic computers and other devices in which a complete combination such as an amplifier or a logic element may be assembled on a single board and constitute an independent unit or module to be inserted as a replaceable package in a more complex system. Often the circuit board is the form of a so called "printed circuit" wherein the interconnections between the circuit elements, and possibly some of the circuit elements themselves, are formed of thin metallic films deposited on boards or sheets of insulating material.

In conventional usage, a rack within the cabinet of an instrument is adapted to mount a plurality of circuit board pluggable connectors. In recent years the circuit board connectors have comprised female connectors with resilient contacts. Printed lines on the circuit board engage the resilient contacts for electrical connection thereto. In addition to an electrical connection, the connector provides a mechanical support for the board.

To incorporate the circuit board into the system, wires must then be soldered to each of the terminals of the female circuit board connector. These wires and those of the connecting cable in turn are soldered to the terminals of a pluggable cable connector of appropriate type. This pluggable cable connector provides the necessary interconnection between the female printed circuit board connector and the cable, but is somewhat tedious to construct. It requires soldering the terminals of two different connectors. This results in excessive time as well as high labor costs.

It is therefore an object of this invention to obviate many of the disadvantages of the prior art cable-circuit board connector assemblies.

Another object of this invention is to provide improved assemblies of the foregoing type that are relatively simple and require relatively few parts.

A further object of this invention is to provide improved assemblies of the foregoing type which are inexpensive and have a reduced number of fastener elements.

An additional object of this invention is to provide an improved connector assembly that is relatively simple to construct and is readily removable from the chassis of the instrument in which it is employed.

In accordance with a preferred embodiment of this invention a combination edge board and flat cable connector assembly is made by forming a generally rectangular hollow enclosure having top, bottom and side walls. The interior surfaces of the top and bottom walls each have parallel ribs formed as by extrusion defining together with the side walls a receptacle for receiving a conventional edge board connector at one end of the enclosure. Additional parallel ribs are cooperatively disposed on the respective interior surfaces of the top and bottom walls to define together a transverse gap with an interior cross-section wider than the lateral spacing of the gap itself. Further parallel ribs are cooperatively extruded on the respective interior surfaces of the top and bottom walls. These ribs have oppositely disposed L-shaped cross-sections and are adopted to interlock with one another. Finally, self-threading screws are introduced through the side walls and adapted to extend into and cooperate with the interior surfaces of the gap, thereby to cause the top and bottom walls of the receptacle to frictionally engage the edge board connector and to be interlocked together.

The side walls may be formed of a molded part which has transversely disposed grooves therein adapted to engage the sides of a rectangular aperture in the cabinet of an instrument in which the connector assembly and printed circuit board are to be mounted. By selecting the sides of a resilient material, the grooved side walls may merely, by snap action, be inserted or "snapped" into the aperture to facilitate the mounting.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figures 1, 2, 3, 4, 5, 6:
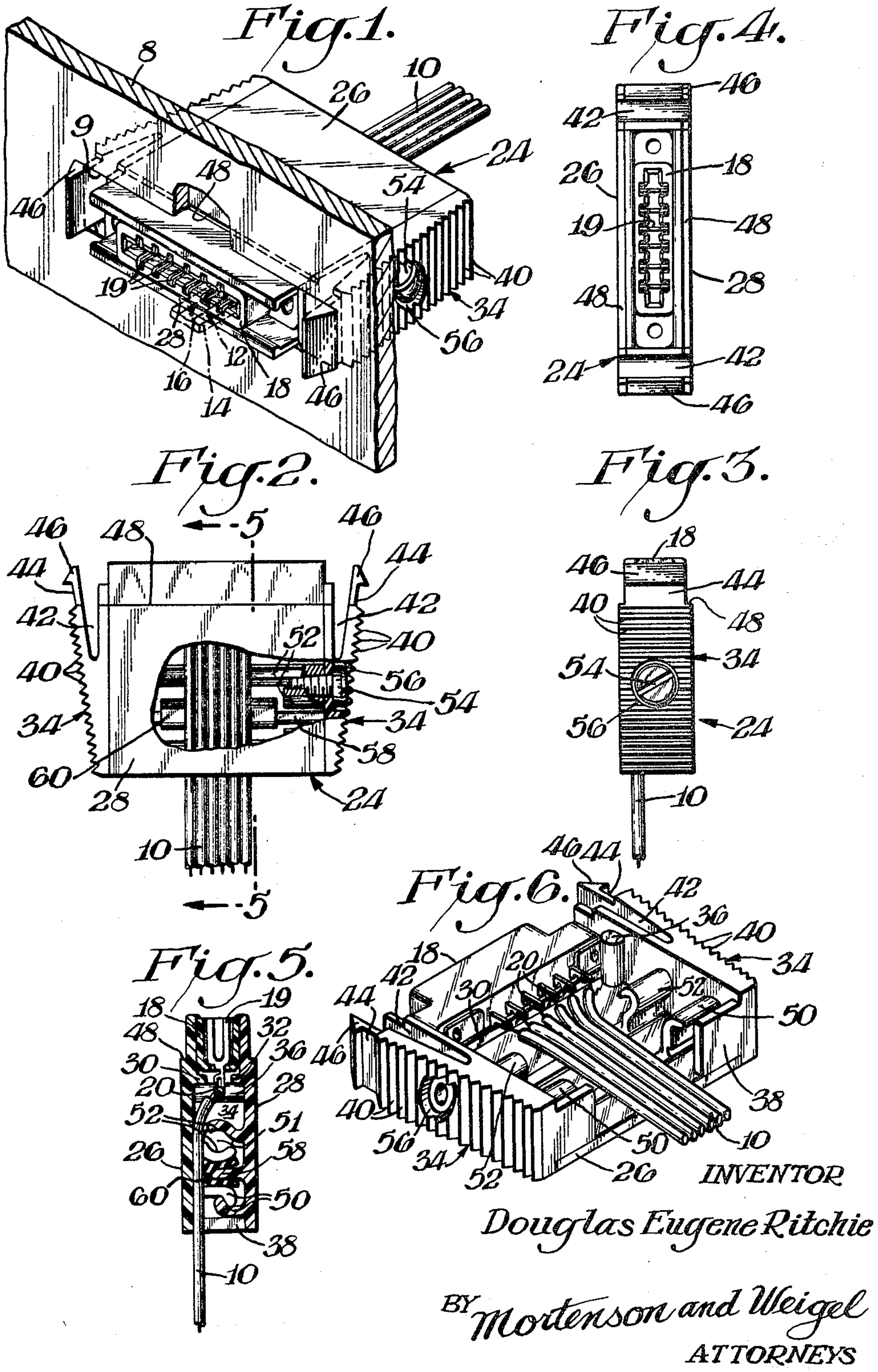
FIGURE 1 is an isometric view of a connector assembly mounted in the wall of an instrument cabinet in accordance with this invention.
FIGURE 2 is a front elevational view, partially cut away, of the connector assembly shown in FIG. 1.
FIGURE 3 is a side view of the connector assembly of FIG. 1.
FIGURE 4 is a plan view of the connector assembly shown in FIG. 1.
FIGURE 5 is a section view of the connector assembly shown in FIG. 2 taken through the section line 5—5.
FIGURE 6 is an isometric view of the connector assembly illustrated in FIG. 1 with the top wall and screw fasteners removed.

In FIG. 1 there is shown an isometric view of a connector assembly which is adapted to mount in the wall 8 of a cabinet of the instrument with which the connector assembly is employed and to provide an electrical connection between a flat conductor cable 10 and a printed circuit board 12. The printed circuit board 12 has an edge portion 14 with printed circuit lines terminating in electrical contact areas 16. This board 12 may be slideably received between the resilient contacts 19 of an edge board connector 18 of conventional design. One suitable edge board connector that may be used, by way of example, is described in U.S. Patent 3,131,017 issued Apr. 28, 1964, to Martin A Mittler. The tails of these resilient contacts 19 of the edge board connector 18 are connected as by soldering at 20 (FIG. 6) to the respective conductors of a conventional flat cable 10. A typical flat cable comprises plural conductors each coated by a thin coating of plastic material and joined together in the form of a flat strip or ribbon. Cable of this type may be purchased, for example, from W. L. Gore & Associates, Newark, Dela.

The circuit board 12 may contain the electrical components of a circuit, for example an amplifier, which are secured to and supported by the board 8 of insulating material. The components may be interconnected by wiring or by a printed circuit comprising thin film conductors deposited on one or both surfaces of the board 8.

The edge connector 18 is mounted in a generally rectangular hollow enclosure 24 having an axis generally parallel to the conductors 10, as is seen perhaps most clearly in FIGS. 1 and 6. The edge connector 18 is clamped in the front end of the hollow enclosure 24 by upper and lower walls 26 and 28, respectively, as well as by side walls 34 of the enclosure. The edge connector 18 is prevented from moving to the rear within the enclosure 24 by transverse ribs 30 and 32, as seen perhaps most clearly in FIG. 5 on the internal surfaces of the respective upper and lower walls 26 and 28. These ribs 30 and 32 are transverse with respect to the axis of the enclosure which lies generally along the conductors 10 of the flat cable 10 of FIG. 1.

In the embodiment of the invention illustrated in the drawings, the side members or walls 34 are molded of a suitable, flexible thermoplastic such as polypropylene. The side members 34 each have corresponding pairs of protuberances 36 and 38, respectively, on their interior portions which act to support and space the respective upper and lower walls 26 and 28, respectively. The shape of these protuberances is not particularly critical, but in the illustrated embodiment the front protuberances 36 are generally half cylindrical in shape and the rear protuberances 38 extend inwardly towards the axis of the enclosure so as to provide a back wall for the connector. The outside 40 of each of the side members 34 is knurled or roughened to facilitate gripping.

Each of the side members 34 is split longitudinally to provide a crevice as at 42 to permit the front end portions of each side member to be flexed inwardly. The extreme front end of each of the side members 34 is formed with a transverse groove 44 which is adapted to engage the instrument housing 8 as seen in FIG. 1 as by inserting or "snapping" the connector assembly directly through the aperture 9 in the housing 8 until a lock fit is obtained. The extreme front or end portion of the side members 34 is tapered outwardly as at 46 to facilitate this operation. To remove the connector assembly from the housing, the side members are squeezed inwardly to disengage the grooves 44 from the housing. Additionally, the upper and lower wall members 26 and 28 have their exterior portions formed with a stepped portion 48. This stepped portion 48, together with the grooves 44, provide a relatively secure mechanical coupling that firmly maintains the connector in the desired position within the cabinet wall or housing 8.

The additional features of the interior portion of the hollow enclosure 24 are seen to include, beginning at the rear portion, a second pair of parallel ribs 50 transversely disposed with respect to the axis along the interior surfaces of the upper and lower wall members 26 and 28, respectively. These ribs 50 each have an L-shaped cross-sectional area and the shoe portion of each L extends in opposite directions such that the two interlock when assembled as seen particularly in FIG. 5.

A third pair of parallel ribs 52 is transversely disposed between the first and second pairs 30–32 and 50. These ribs 52 extend from the respective upper and lower wall members 26 and 28 and are generally arcuate in cross-section shape and define together a transverse gap having an interior cross section 51 that is wider than a lateral spacing between the ribs 52. These ribs 52 are adapted to receive self-threading screws 54 or other fasteners which are introduced through holes 56 in the side members 34. The function of the screws 54 is to expand the gap between the ribs 52 so as to force the rear interlocking ribs 50 more tightly together as well as to draw the upper and lower wall members 24 and 26, respectively, inwardly so as to tightly engage the edge connector 18 as well as the spacers 36 and 38, respectively. The central portion of the ribs 50 and 52 formed on the lower member 28, as seen in FIGS. 5 and 6, is removed so as to accommodate the flat cable 10.

To complete the assembly, a final transversely disposed rib 58 on the upper wall member 26 extends from the interior thereof substantially parallel to the remaining ribs and is physically located between the second and third pair of ribs 50 and 52, respectively, and extends substantially throughout the thickness of the enclosure. A resilient pad having a U-shaped cross-section of an insulating material is placed over the end portion of the final rib 58 and is adapted to pressingly engage the flat cable 10 against the interior portion of the lower wall member 26, thereby to fixedly engage the cable 10 and prevent the solder connections 20 to the edge connector 18 from being subjected to undue mechanical stresses.

The upper and lower wall members 26 and 28 may be fabricated conveniently by cutting the required lengths from stock material produced by conventional extrusion methods. Typically, these members are formed from aluminum or other extrudable metal or plastic. The assembly of the connector is relatively simple and is accomplished first by soldering the several conductors of the cable 10 to the terminals 20 of the edge connector 18. Next the cable 10 and the attached edge connector 18 are positioned on the lower wall member 26 as seen in FIG. 6 and the upper wall member near rib 50 is manipulated to engage the cooperating rib 50 of the lower wall member 26. The side members 34 are then fitted into place so as to maintain the spacing between the wall members 26 and 28. Prior to this operation the U-shaped pad 60 is placed over the locking rib 58 so as to engage the cable 10. As a final step the screws 54 are introduced through the holes 56 in the side members 34 and tightened. The tightening operation causes each of the wall members 26 and 28 to tightly engage the edge connector 18 at its upper and lower portions and also the locking rib causes the U-shaped pad 60 to frictionally engage the cable 10 such that it also is tightly held in position. The side members 34 prevent the side movement of the edge connector 18. The connector assembly may now be snap fitted into the aperture 9 in the wall of the instrument housing with the step portions 48 and the grooves 44 engaging the peripheral portions of the aperture 9.

The connector assembly of this invention is electrically and mechanically the substantial equivalent of a unitary piece. The connector is mechanically stable and secure and yet is easily mountable and demountable within an aperture cut in the wall of a cabinet. A printed circuit board may have its edge mounted securely within the connector 18. The flat cable cannot easily be pulled loose.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. An edge board and flat cable connector assembly comprising:

an edge board connector, having a generally rectangular cross-section, an enclosure of generally hollow, rectangular cross-section having an axis and respective top, bottom, and side walls, the interior surfaces of said top and bottom walls each having oppositely disposed parallel ribs defining together with said side walls a receptacle for receiving said edge board connector at one end of said enclosure, additional parallel ribs cooperatively disposed on the respective interior surfaces of said top and bottom walls defining together a transverse gap with an interior cross-section wider than the lateral spacing therebetween, further parallel ribs of L-shaped cross-section cooperatively disposed on the respective interior surfaces of said top and bottom walls adapted to interlock, and means removably securing said side walls including fastener extending into and cooperating with the interior surfaces of said transverse gap to cause said top and bottom walls of said receptacle to frictionally engage said edge board connector.

2. The assembly according to claim 1 further characterized in that each of said ribs and said gap are transverse to the axis of said enclosure, and each is of uniform cross-section throughout its length, whereby part of said enclosure is adapted to fabrication by extrusion.

3. The assembly according to claim 1 further characterized in that, said assembly is adapted to be removably mounted in a housing wall having an aperture, said side walls being formed of a resilient material, and the exterior surface of each of said side walls including means defining transverse grooves at said one end of said enclosure adapted to engage the sides of said aperture in said housing wall.

4. The assembly according to claim 1 further characterized in that the interior surface of each of said side walls has a pair of transversely disposed protuberances each adapted to abut at either end the interior surfaces of said upper and lower walls, thereby to control minimum spacing and prevent rotation of said side walls.

5. The assembly according to claim 1 further characterized by:

a still further rib on the interior surface of said bottom wall parallel to the remaining ones of said ribs, said cable adapted to be connected to said edge board connector and extend axially through said enclosure, said still further rib adapted to frictionally engage said cable against the interior surface of said upper wall, thereby to relieve stress on the connection between said cable and said edge board connector, said additional and further ribs on said top wall being discontinuous thereby to provide an axial passage for said cable through said enclosure.

6. The assembly according to claim 5 further characterized in that the interior surface of each of said side walls has a pair of transversely disposed protuberances each adapted to abut at either end the interior surfaces of said upper and lower walls, thereby to control the minimum spacing and prevent rotation of said side walls.

7. The assembly according to claim 5 further characterized by a resilient pad having a U-shaped cross-section adapted to fit over said still further rib to frictionally engage said cable.

8. The assembly according to claim 5 further characterized in that:

said assembly is adapted to be removably mounted in a housing wall having an aperture, said side walls being formed of a resilient material, and the exterior surface of each of said side walls including means defining transverse grooves at said one end of said enclosure adapted to engage the sides of said aperture in said housing wall.

9. The assembly according to claim 8 further characterized by a resilient pad having a U-shaped cross-section adapted to fit over said still further rib to frictionally engage said cable.

10. The assembly according to claim 8 further characterized in that said side walls are molded.

11. An edge board and flat cable connector assembly comprising:

an edge board connector, having a generally rectangular cross-section, an enclosure of generally hollow, rectangular cross-section having an axis and respective top, bottom, and side walls, the interior surfaces of said top and bottom walls each having oppositely disposed parallel ribs defining together with said side walls a receptacle for receiving said edge board connector at one end of said enclosure, additional parallel ribs cooperatively disposed in the respective interior surfaces of said top and bottom walls defining together a transverse gap with an interior cross-section wider than the lateral spacing therebetween, further parallel ribs of L-shaped cross-section cooperatively disposed on the respective interior surfaces of said top and bottom walls adapted to interlock, means removably securing said side walls including fasteners extending into and cooperating with the interior surfaces of said transverse gap to cause said top and bottom walls of said receptacle to frictionally engage said edge board connector, a still further rib on the interior surface of said lower wall substantially parallel to the remaining ones of said ribs, said cable adapted to be connected to said edge board connector and to extend axially through said enclosure, a U-shaped resilient pad adapted to fit over said still further rib to frictionally engage said cable, thereby to relieve stress on the connection between said cable and said edge board connector, said additional and further ribs on said upper wall being discontinuous thereby to provide an axial passage for said cable through said enclosure, each of said ribs and gap being transverse to the axis of said enclosure and of uniform cross-section throughout its length, whereby part of said enclosure is adapted to fabrication by extrusion, said assembly being adapted to be removably mounted in a housing wall having an aperture, said side walls being molded, the exterior surface of each of said side walls defining transverse grooves at said one end of said enclosure to engage the sides of said aperture in said housing wall, the interior surface of each of said side walls having a pair of transversely disposed protuberances each adapted to abut at either end the interior surfaces of said top and bottom walls, thereby to control the minimum spacing and prevent rotation of said side walls.

References Cited

UNITED STATES PATENTS

| | | | |
|---|---|---|---|
| 2,891,103 | 6/1959 | Swengel | 339—128 |
| 2,946,033 | 7/1960 | Wirth | 339—128 X |
| 3,079,581 | 2/1963 | Klumpp | 339—128 |
| 3,112,148 | 11/1963 | Wochner | 339—208 X |

MARVIN A. CHAMPION, *Primary Examiner.*

J. R. MOSES, *Assistant Examiner.*

U.S. Cl. X.R.

339—17, 208